United States Patent
Song et al.

(10) Patent No.: US 11,107,356 B2
(45) Date of Patent: Aug. 31, 2021

(54) CELLULAR NETWORK-BASED ASSISTED DRIVING METHOD AND TRAFFIC CONTROL UNIT

(71) Applicant: HUAWEI TECHNOLOGIES CO., LTD., Shenzhen (CN)

(72) Inventors: Yonggang Song, Beijing (CN); Hui Li, Shenzhen (CN); Xiao Yang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/862,593

(22) Filed: Apr. 30, 2020

(65) Prior Publication Data

US 2020/0258389 A1    Aug. 13, 2020

Related U.S. Application Data

(63) Continuation of application No. PCT/CN2018/112722, filed on Oct. 30, 2018.

(30) Foreign Application Priority Data

Oct. 31, 2017    (CN) .......................... 201711051120.4

(51) Int. Cl.
   *G08G 1/09*    (2006.01)
   *G08G 1/16*    (2006.01)
   *H04W 4/44*    (2018.01)

(52) U.S. Cl.
   CPC ............ *G08G 1/164* (2013.01); *G08G 1/166* (2013.01); *H04W 4/44* (2018.02)

(58) Field of Classification Search
   CPC ....... G08G 1/164; G08G 1/166; B60W 30/08; B60W 30/0953; B60W 30/095;
   (Continued)

(56) References Cited

U.S. PATENT DOCUMENTS 8,265,861 B2*    9/2012    Ikeda ................. G08G 1/09675
                                                           701/117
9,604,641 B2*    3/2017    Al-Stouhi ............. B60W 10/18
(Continued)

FOREIGN PATENT DOCUMENTS

CN          1916991 A      2/2007
CN        101681562 A      3/2010
(Continued)

OTHER PUBLICATIONS

Wang Jian-giang et al. Concept,Principle and Modeling of Driving Risk Field Based on Driver-vehicle-road Interaction, China Journal of Highway and Transport, Jan. 2016. total 16 pages.
(Continued)

*Primary Examiner* — Toan N Pham
(74) *Attorney, Agent, or Firm* — Maier & Maier, PLLC

(57) ABSTRACT

A cellular network-based assisted driving method and a traffic control unit are provided, to accurately assess a risk and provide a valuable safety warning for a vehicle. In various embodiment, a first about-to-occur track of a first vehicle is determined based on traveling status information of the first vehicle. The first about-to-occur track is a traveling track of the first vehicle that is to occur within preset duration from a current moment. Warning information can be sent to the first vehicle when it is determined that a second about-to-occur track of a second vehicle intersects the first about-to-occur track. The second about-to-occur track is a traveling track of the second vehicle that is to occur within the preset duration from the current moment.

15 Claims, 6 Drawing Sheets

(58) Field of Classification Search
CPC ........ B60W 30/18154; B60W 30/0956; G05D 1/0276; G05D 1/024; G05D 1/0289
See application file for complete search history.

(56) References Cited

U.S. PATENT DOCUMENTS

| | | | |
|---|---|---|---|
| 9,751,506 B2 * | 9/2017 | Mudalige | ............... G08G 1/166 |
| 9,868,393 B2 | 1/2018 | Bahgat et al. | |
| 2013/0253815 A1 | 9/2013 | Orfila et al. | |
| 2014/0372016 A1 | 12/2014 | Buchholz et al. | |
| 2016/0129907 A1 | 5/2016 | Kim et al. | |
| 2017/0113683 A1 | 4/2017 | Mudalige et al. | |
| 2017/0162050 A1 | 6/2017 | Chen et al. | |

FOREIGN PATENT DOCUMENTS

| | | | |
|---|---|---|---|
| CN | 101734216 A | 6/2010 |
| CN | 102473307 A | 5/2012 |
| CN | 103823466 A | 5/2014 |
| CN | 104539874 A | 4/2015 |
| CN | 105303886 A | 2/2016 |
| CN | 105599764 A | 5/2016 |
| CN | 106585631 A | 4/2017 |
| CN | 106846902 A | 6/2017 |
| CN | 108022450 A | 5/2018 |
| CN | 108091155 A | 5/2018 |
| DE | 102016205661 A1 | 10/2017 |
| EP | 1898232 A1 | 3/2008 |
| EP | 3032516 A1 | 6/2016 |
| JP | H11110699 A | 4/1999 |
| JP | 2013218678 A | 10/2013 |
| WO | 2011110227 A1 | 9/2011 |
| WO | 2017056726 A1 | 4/2017 |
| WO | 2019052357 A1 | 3/2019 |

OTHER PUBLICATIONS

Zhu Su-jia et al. Crossroad traffic model based on the road-safety-field, Journal of the Hebei Academy of Sciences, vol. 27 No. 2, Jun. 2010. total 5 pages.

* cited by examiner

Relative
traveling line

CELLULAR NETWORK-BASED ASSISTED DRIVING METHOD AND TRAFFIC CONTROL UNIT

CROSS-REFERENCE TO RELATED APPLICATIONS

This application is a continuation of International Application No. PCT/CN2018/112722, filed on Oct. 30, 2018, which claims priority to Chinese Patent Application No. 201711051120.4, filed on Oct. 31, 2017, The disclosures of the aforementioned applications are hereby incorporated by reference in their entireties.

TECHNICAL FIELD

Embodiments of the present invention relate to the field of intelligent transportation technologies, and in particular, to a cellular network-based assisted driving method and a traffic control unit.

BACKGROUND

A vehicle-to-another-apparatus (vehicle to x, V2X) communications technology is used to implement communication between a vehicle and another target object, such as vehicle-to-vehicle V2V) communication, vehicle-to-infrastructure (vehicle to installation, V2I) communication, and vehicle-to-pedestrian communication. A real-time road condition, road information, and pedestrian information can be obtained by using the V2X technology, thereby improving driving safety. Currently, V2X assisted driving is implemented based on dedicated short range communications (DSRC) by using an ad hoc network. Because problems such as technical limitations and high deployment costs exist in a DSRC-based solution, it is always difficult to effectively popularize and apply the DSRC-based solution.

Recently, there are more solutions to implementing V2X assisted driving based on a cellular network. In the solutions, risk analysis and scheduling may be performed based on a roadside traffic control unit (TCU). The solutions have more significant popularization and implementation advantages than the DSRC-based solution. After performing the risk analysis, the TCU sends a warning based on an analysis result.

However, a risk analysis method used in an existing solution to implementing V2X assisted driving based on a cellular network is excessively complex and is relatively difficult to implement, and therefore cannot be effectively applied to a traffic warning.

SUMMARY

Embodiments provide a cellular network-based assisted driving method and a traffic control unit, to provide, in a process of implementing V2X assisted driving based on a cellular network, a new solution to performing risk estimation and implementing a traffic warning.

Example technical solutions provided in various embodiments are as follows:

According to a first aspect, a cellular network-based assisted driving method is provided, where a cellular network includes at least a traffic control unit TCU, and a vehicle within a management range of the TCU may access the cellular network by using a communications module. The TCU calculates an about-to-occur track of the vehicle by using obtained traveling status information of the vehicle within the management range; determines, by using an about-to-occur track of a target vehicle and an about-to-occur track of an adjacent vehicle, whether the about-to-occur track of the target vehicle intersects the about-to-occur track of the adjacent vehicle; and if the about-to-occur track of the target vehicle intersects the about-to-occur track of the adjacent vehicle, determines that the adjacent vehicle is a risky vehicle, and sends a warning to the target vehicle. In this way, this can help implement more accurate and effective risk estimation to provide a more valuable safety warning for the target vehicle. An implementation process of the method is simple and effective, warning information provided for the target vehicle is more targeted and accurate, and information processing of a vehicle-mounted terminal can be simplified, to reduce a terminal requirement.

In a possible design, the target vehicle is denoted as a first vehicle, and the adjacent vehicle is denoted as a second vehicle. A specific method is as follows: determining a first about-to-occur track of the first vehicle based on traveling status information of the first vehicle, where the first about-to-occur track is a traveling track of the first vehicle that is to occur within preset duration from a current moment, the second about-to-occur track is a traveling track of the second vehicle that is to occur within the preset duration from the current moment, the first about-to-occur track includes a first primary traveling track and at least one first secondary traveling track, an occurrence probability of the first primary traveling track is greater than an occurrence probability of the first secondary traveling track, and the occurrence probability of the first primary traveling track and the occurrence probability of the first secondary traveling track are determined by using the traveling status information of the first vehicle; and sending, by the TCU, warning information to the first vehicle if the TCU determines that the second about-to-occur track of the second vehicle intersects the first about-to-occur track within the management range of the TCU, where the second about-to-occur track of the second vehicle is determined by using traveling status information of the second vehicle.

In a possible design, the preset duration is determined based on a reaction time of a user and a braking time of a vehicle. In this way, risks can be more effectively determined, and the warning information is more accurate.

In a possible design, the traveling status information includes at least one of a position, a vehicle head direction, a steering wheel angle, a vehicle speed, acceleration, an angular speed, and angular acceleration.

In a possible design, the TCU obtains the traveling status information of the first vehicle in at least one of the following manners: a manner of performing reporting by the first vehicle, a manner of performing reporting through sensing by using another vehicle sensor, a manner of performing reporting through collection by a roadside sensor, a manner of performing reporting by a roadside signal device, and a manner of performing notification by a central service unit or an adjacent TCU.

In a possible design, the TCU obtains the traveling status information of the second vehicle in at least one of the following manners: a manner of performing reporting by the second vehicle, a manner of performing reporting through sensing by using another vehicle sensor, a manner of performing reporting through collection by a roadside sensor, a manner of performing reporting by a roadside signal device, and a manner of performing notification by a central service unit or an adjacent TCU.

In a possible design, the first about-to-occur track may be further determined with reference to at least one of a traveling direction attribute of a lane in which the first vehicle is currently located and driving intention information of the first vehicle. The second about-to-occur track may be further determined with reference to at least one of a traveling direction attribute of a lane in which the second vehicle is currently located and driving intention information of the second vehicle. The driving intention information includes at least one of path planning information, turn light information, and intention information reported by a driver. In this way, when there are more factors for determining an about-to-occur track, the obtained about-to-occur track is closer to reality, further risk estimation is more accurate, and the sent warning information is more accurate.

In a possible design, a possible case of determining that the second about-to-occur track intersects the first about-to-occur track includes: determining that the first primary traveling track intersects a second primary traveling track or a second secondary traveling track; and/or determining that the first secondary traveling track intersects a second primary traveling track or a second secondary traveling track. In this way, according to a risk maximization principle, a risk with a small possibility can be prevented from being missed, so that about-to-occur tracks with more possibilities of a vehicle can be obtained, estimated risks are more comprehensive, and the sent warning information is more comprehensive.

In a possible design, the warning information includes a risk level; and the TCU determines the risk level based on at least one of a distance from the intersection position to the first vehicle, a distance from the intersection position to the second vehicle, and the occurrence probabilities of the intersecting traveling tracks.

In a possible design, a shorter distance from the intersection position to a current position of the first vehicle indicates a higher risk level, and a shorter distance from the intersection position to a current position of the second vehicle indicates a higher risk level. Specifically, a risk level in a case in which the intersection position is on an anterior segment of the first primary traveling track is higher than a risk level in a case in which the intersection position is on a posterior segment of the first primary traveling track; a risk level in a case in which the intersection position is on an anterior segment of the first secondary traveling track is higher than a risk level in a case in which the intersection position is on a posterior segment of the first secondary traveling track; a risk level in a case in which the intersection position is on an anterior segment of the second primary traveling track is higher than a risk level in a case in which the intersection position is on a posterior segment of the second primary traveling track; and a risk level in a case in which the intersection position is on an anterior segment of the second secondary traveling track is higher than a risk level in a case in which the intersection position is on a posterior segment of the second secondary traveling track. The anterior segment of the first primary traveling track and the anterior segment of the first secondary traveling track are tracks of the first vehicle that are to occur within first sub-duration from the current moment. The posterior segment of the first primary traveling track and the posterior segment of the first secondary traveling track are tracks of the first vehicle that are to occur within second sub-duration after the first sub-duration. The anterior segment of the second primary traveling track and the anterior segment of the second secondary traveling track are tracks of the second vehicle that are to occur within the first sub-duration from the current moment. The posterior segment of the second primary traveling track and the posterior segment of the second secondary traveling track are tracks of the second vehicle that are to occur within the second sub-duration after the first sub-duration. The preset duration is a sum of the first sub-duration and the second sub-duration. A risk level in a case in which the intersection position is on the first primary traveling track is higher than a risk level in a case in which the intersection position is on the first secondary traveling track. A risk level in a case in which the intersection position is on the second primary traveling track is higher than a risk level in a case in which the intersection position is on the second secondary traveling track. In this way, risks are classified into different levels. This helps the driver to take a corresponding risk avoidance measure based on the risk level. The risk levels are classified based on the intersection position, so that information processing of a vehicle-mounted terminal can be simplified, and a processing manner can be simpler and more effective.

In a possible design, the warning information may further include at least one of the intersection position, the risk level, attribute information of a risky vehicle, and a suggestion of taking a measure. The attribute information of the risky vehicle may include a position, a vehicle head direction, a speed, a vehicle model, a color, whether the vehicle is a vehicle with a special task, and the like. The suggestion of taking a measure may include suggestions of acceleration, deceleration, a lane change, and the like that are given to the target vehicle.

In a possible design, the intersection includes that there is one intersection point; when it is determined that there is a partial overlap between the first about-to-occur track and the second about-to-occur track, it is determined whether the second vehicle is located on a relative traveling track between the first vehicle and the second vehicle within the preset duration from the current moment; and if yes, the warning information is sent, where the partial overlap means that there are at least two intersection points, and the relative traveling track is a track formed by changes in relative positions of the first vehicle and the second vehicle within the preset duration from the current moment. In some embodiments, a length of the relative traveling track is a product of the preset duration and a relative speed between the first vehicle and the second vehicle. In this way, processing can be performed with reference to a normal vehicle-following application scenario, thereby ensuring basic traveling safety and avoiding excessive invalid warnings.

In a possible design, in an application scenario in which the vehicles travel in a same lane, although there is a partial overlap between the about-to-occur track of the first vehicle and the about-to-occur track of the second vehicle, this case may be considered as a special intersection scenario, and an intersection position may be set to a start point or a midpoint of a line segment of an overlapped part.

According to a second aspect, a traffic control unit TCU is provided, and the apparatus has functions of implementing behavior of a transmit end in any one of the first aspect or the possible designs of the first aspect. The functions may be implemented by using hardware, or may be implemented by executing corresponding software by hardware. The hardware or the software includes one or more modules corresponding to the functions.

In some embodiments, the TCU may be a chip or an integrated circuit.

In a possible design, when some or all of the functions are implemented by using software, the TCU includes a processor configured to execute a program. When the program is executed, the TCU may implement the method in any one of the first aspect or the possible designs of the first aspect. In some embodiments, the TCU further includes a memory, configured to store the program executed by the processor.

In some embodiments, the memory may be a physically independent unit, or may be integrated into the processor.

In a possible design, when some or all of the functions are implemented by using software, the TCU includes a processor. A memory configured to store a program is located outside the TCU. The processor is connected to the memory by using a circuit/wire, and is configured to read and execute the program stored in the memory.

According to a third aspect, a computer storage medium is provided and stores a computer program. The computer program includes an instruction used to perform the method in any one of the first aspect or the possible designs of the first aspect.

According to a fourth aspect, an embodiment of the present invention provides a computer program product that includes an instruction. When the computer program product is run on a computer, the computer is enabled to perform the method in the foregoing aspect.

DESCRIPTION OF EMBODIMENTS

The following describes embodiments in detail with reference to the accompanying drawings.

Figure 1:
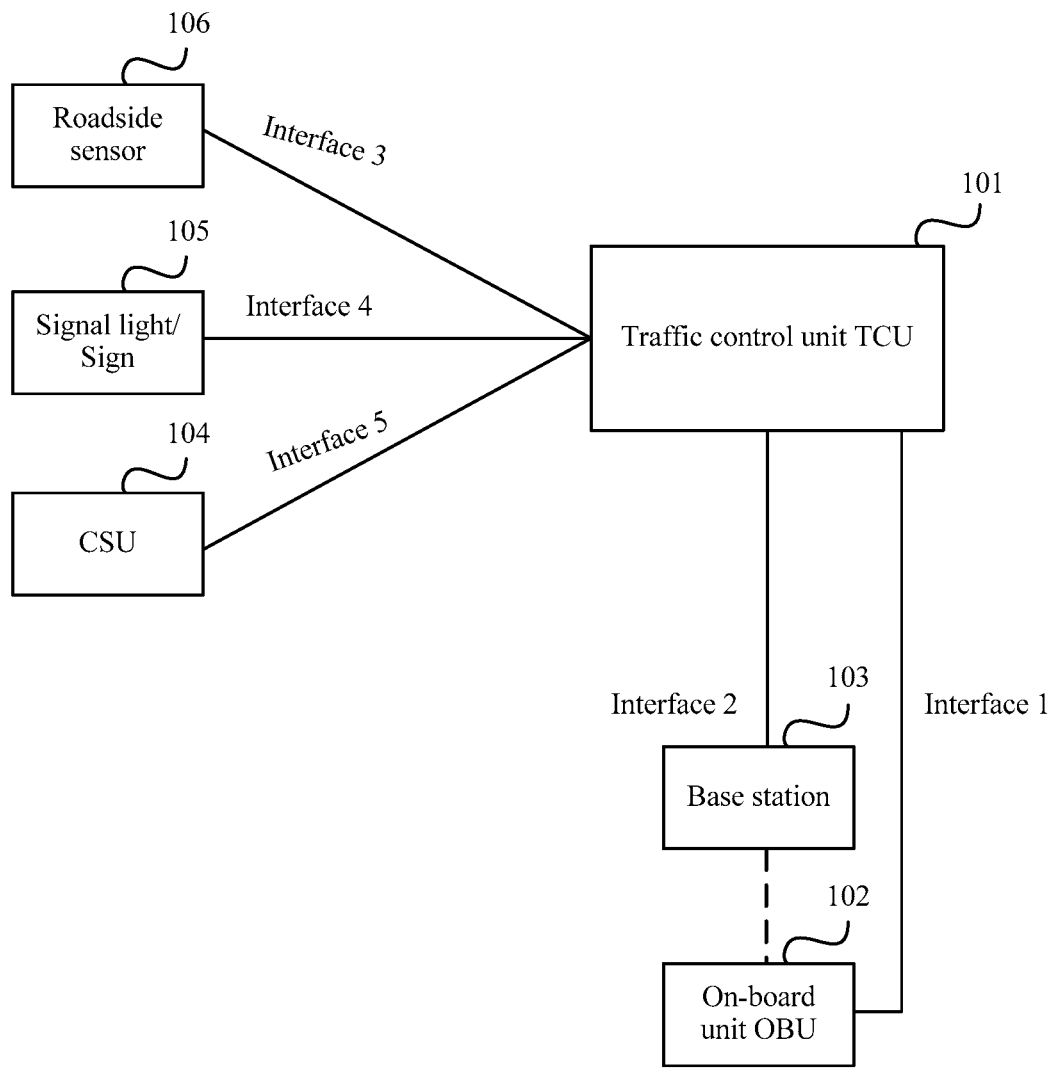
FIG. 1 is a schematic structural diagram of an intelligent transportation system according to an embodiment of the present invention.

The present invention may be applied to the field of implementing V2X assisted driving based on a cellular network. Currently, an LTE technology is applied to a vehicle network system to form an LTE-vehicle (LTE-V) system. The embodiments may be applied to the LTE-V system, and certainly may be further applied to a future 5th generation mobile communications system (5G) or other more possible application systems. A cellular network-based assisted driving method and an apparatus that are provided in the embodiments of the present invention may be applied to an intelligent transportation system. FIG. 1 is a schematic structural diagram of a framework of an example intelligent transportation system according to one embodiment. The intelligent transportation system includes a TCU 101, an on-board unit (OBU) 102, and a base station 103. In some embodiments, the intelligent transportation system further includes an intelligent-transportation central service unit (CSU) 104, a signal light/sign 105, and a roadside sensor 106. The TCU 101 interacts with the OBU 102 through an interface 1. The interface 1 is an application layer interface for communication between the OBU 102 and the TCU 101. The TCU 101 interacts with the base station 103 through an interface 2. The interface 2 is an interface between the TCU 101 and a cellular network. The TCU 101 needs to reduce a communication delay by using a network LBO capability and a mobile edge computing (MEC) capability, to implement an anti-collision-type assisted driving application with high real-time performance. The TCU 101 is connected to different network elements in the cellular network based on a deployment requirement. Interfaces provided by the different network elements are different. The TCU 101 needs to adapt to these interfaces to ensure a communication delay, reliability, and bandwidth between the OBU 102 and the TCU 101. The TCU 101 interacts with the roadside sensor 106 through an interface 3. The interface 3 is an interface between the TCU 101 and the roadside sensor 106, and is configured to transfer sensing data. The sensing data may be a video stream, point cloud data of radar, or structured person, vehicle, or object data. The TCU 101 interacts with the signal light/sign 105 through an interface 4. The interface 4 is configured to transfer traffic signal light data and traffic sign data. The TCU 101 interacts with the CSU 104 through an interface 5. The CSU 104 may send an alarm or an event to the OBU 102 by using the TCU 101. The base station 103 interacts with the OBU 102 through an interface between a terminal and the cellular network. For example, if the base station 103 is an evolved NodeB in long term evolution (LTE), the base station 103 may interact with the OBU 102 through an LTE-Uu interface. The LTE-Uu interface is a physical access layer interface for communication between the OBU 102 and the TCU 101, and is an interface that is between a terminal and a base station and that is defined in the 3rd generation partnership project (3GPP). In an example of an LTE network, the LTE-Uu interface may be an interface between the terminal and a 2G, 3G, 4G, or 5G cellular network.

The TCU 101 is a core component of an intelligent transportation system 100, holds V2X communication data, is a server deployed on a cellular network side, and reduces a communication delay by using a network LBO or mobile edge computing (MEC) capability. LBO is an abbreviation for local break out. The TCU 101 is configured to collect vehicle status information and alarm data that are sent by the OBU 102 by using the base station 103, and is configured to screen risk data and the alarm data for a target vehicle, to reduce a bandwidth requirement required for V2X communication. The TCU 101 is further configured to: collect sensing data from the roadside sensor 106, signal light data, sign data, and notification or alarm data from the CSU 104 to the OBU 102, and deliver the data to the target vehicle after the screening.

The OBU 102 may be in a form of a vehicle, or may be in a form of a combination of a T-Box and an intelligent mobile terminal. The OBU 102 is configured to: obtain vehicle traveling status information, and send the vehicle traveling status information to the TCU 101 by using the base station 103. The OBU 102 is further configured to: receive risk data such as alarm, event, signal light, or sign data, and prompt a driver by using a voice and a video. In this embodiment of the present invention, the OBU 102 may be described as a vehicle, and the OBU 102 and the vehicle play a same role in implementation of the cellular network-based assisted driving method provided in this embodiment of the present invention. It may be considered that steps performed by the vehicle are steps performed by the OBU 102. It should be noted that, although this embodiment of the present invention is described by using a vehicle as an example, the method is applicable to any traffic participant, such as a pedestrian, a bicycle, or a still obstacle.

The CSU 104 may send warning data to the OBU 102 by using the TCU 101.

The signal light/sign 105 is configured to provide traffic signal light data and traffic sign data for the TCU 101, and the TCU 101 forwards the traffic signal light data and the traffic sign data to a vehicle in a signal light/sign control area.

The roadside sensor 106 is configured to provide roadside sensing data for the TCU 101, so that the TCU 101 can analyze a risk in vehicle traveling with reference to the roadside sensing data.

Based on the intelligent transportation system shown in FIG. 1, the following describes in detail a cellular network-based assisted driving method provided in an embodiment of the present invention. The cellular network includes at least a TCU, and a vehicle within a management range of the TCU may access the cellular network by using a communications module.

It should be noted that the cellular network-based assisted driving method provided in this embodiment of the present invention may be performed by the TCU. A vehicle that needs to perform risk estimation and receive warning information may be referred to as a target vehicle, may be referred to as a primary vehicle, or may be referred to as a first vehicle in the following description. A vehicle that causes a risk to the target vehicle in the risk estimation may be referred to as a risky vehicle, or may be referred to as a second vehicle in the following description. In actual application, alternatively, there may be two or more risky vehicles.

Figure 2:
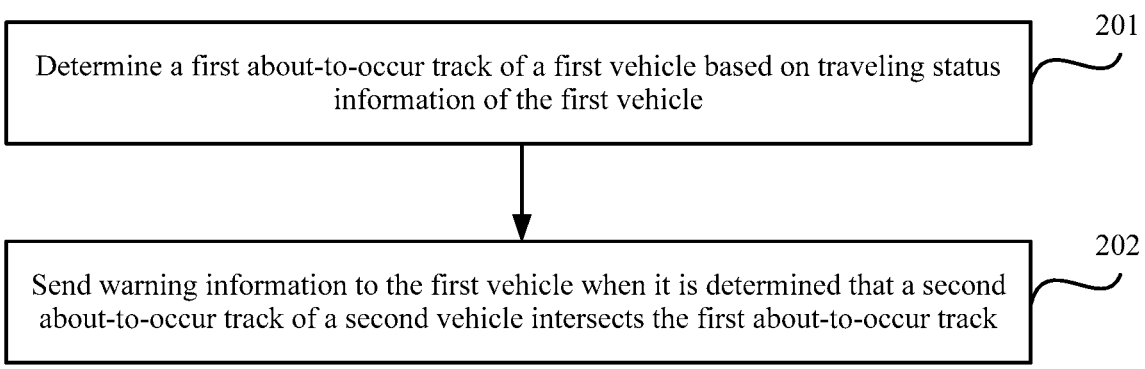
FIG. 2 is a schematic flowchart of a cellular network-based assisted driving method according to an embodiment of the present invention.

As shown in FIG. 2, an example procedure of a cellular network-based assisted driving method provided in an embodiment of the present invention may be described as follows.

Step 201: A TCU determines a first about-to-occur track of a first vehicle based on traveling status information of the first vehicle.

Step 202: The TCU sends warning information to the first vehicle if the TCU determines that a second about-to-occur track of a second vehicle intersects the first about-to-occur track.

The about-to-occur track described in this embodiment of the present invention is a track of a vehicle that is to occur, and may be a traveling track of the vehicle that is to occur within preset duration from a current moment. For example, the first about-to-occur track is a traveling track of the first vehicle that is to occur within preset duration from a current moment, and the second about-to-occur track is a traveling track of the second vehicle that is to occur within the preset duration from the current moment. The preset duration is an empirical value, and is determined based on a reaction time of a driver and a braking time of the vehicle. For example, the preset duration may be set to 5 seconds.

The following describes how the TCU determines the about-to-occur track of the vehicle, including how to determine the first about-to-occur track of the first vehicle and how to determine the second about-to-occur track of the second vehicle.

In actual implementation, periodically reporting traveling status information frequently by the vehicle may be considered as reporting the traveling status information by the vehicle in real time. The traveling status information includes at least one of a vehicle position, a vehicle head direction, a steering wheel angle, a vehicle speed, acceleration, an angular speed, and angular acceleration. The TCU receives the traveling status information reported by the vehicle, obtains a current position of the vehicle in the traveling status information, and can infer, based on some information in the traveling status information, the traveling track of the vehicle that may occur within the preset duration. For example, the current position of the vehicle is determined, it is determined, based on the steering wheel angle, that the vehicle travels straight, a displacement of the vehicle within the preset duration can be obtained based on vehicle speed or acceleration information according to existing physical knowledge, and the about-to-occur track of the vehicle within the preset duration can be roughly determined based on the displacement.

In some embodiments, if the TCU can obtain driving intention information of the driver, the TCU may further determine the about-to-occur track with reference to the driving intention information. The driving intention information may include, but is not limited to, at least one of path planning information, turn light information, and intention information reported by the driver. For example, the TCU may determine, based on the path planning information, the turn light information, the intention information reported by the driver, traffic light phase information, and the like, a driving intention, a route along which the vehicle is to travel within future preset duration, and whether the route is a straight route, a left-turn route, a right-turn route, or a turn-around route. In this way, this can help the TCU more accurately determine the about-to-occur track. The intention information reported by the driver may be a driving intention of the driver that is reported by the driver by using a voice from a terminal such as an OBU or a mobile phone.

In addition, the TCU may further determine the about-to-occur track with reference to a traveling direction attribute of a lane in which the vehicle is currently located. At a junction, a lane has a clear traveling direction attribute. For example, the lane is a straight lane, a left/right-turn lane, and a straight+left/right-turn lane. For example, if the lane in which the vehicle is currently located is a straight lane, the TCU may consider that a possible traveling track of the vehicle that is to occur within the preset duration is a straight line.

Because vehicle reporting capabilities are different, in addition to a manner of reporting the traveling status information by the vehicle, the TCU may obtain the traveling status information of the vehicle and other supplementary information used to determine the about-to-occur track of the vehicle in manners such as performing reporting through sensing by a vehicle-mounted sensor, performing reporting through collection by a roadside sensor, performing reporting by a roadside signal device, CSU notification, and notification from an adjacent TCU. The performing reporting through sensing by a vehicle-mounted sensor means that if a sensor such as a vehicle-mounted camera or radar can sense another surrounding target object, the sensor may report sensing data to the TCU. The roadside signal device may be the signal light/sign 105 in the system shown in FIG. 1.

The foregoing several reference factors for determining the about-to-occur track of the vehicle are merely examples. In some embodiments, the TCU may further determine the about-to-occur track of the vehicle with reference to or based on another reference factor.

Figure 3:
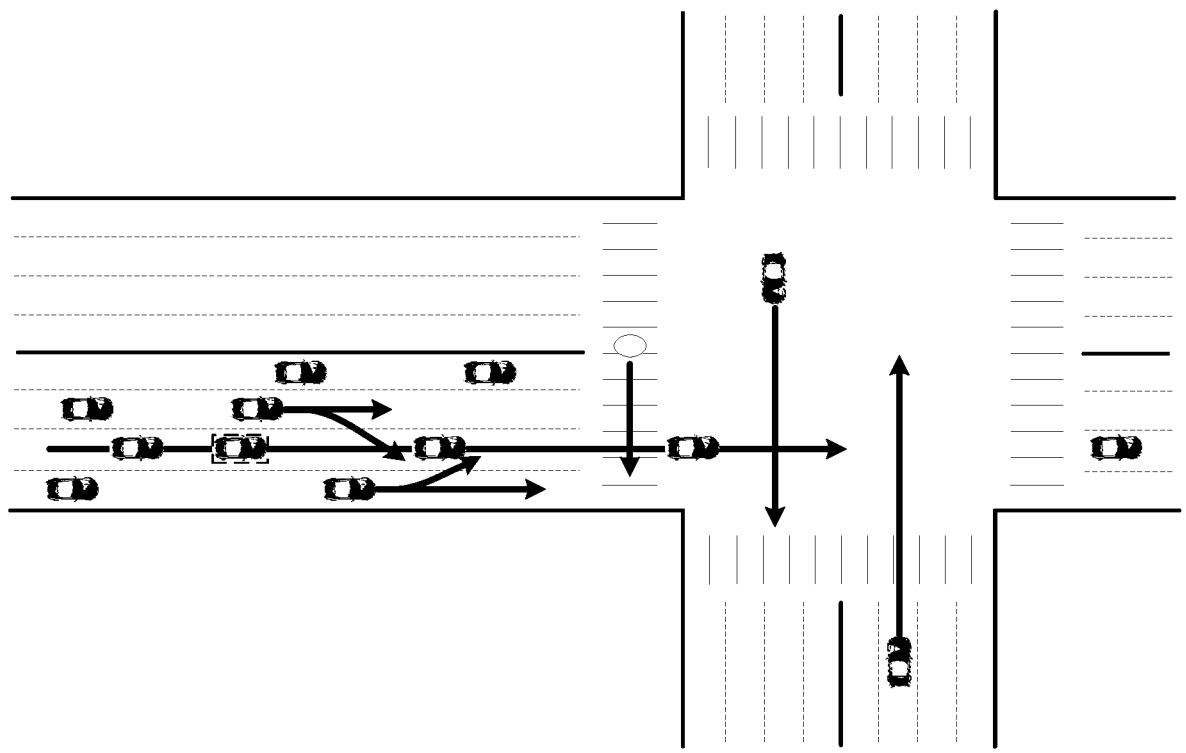
FIG. 3 is a schematic diagram of a network formed by about-to-occur tracks of vehicles according to an embodiment of the present invention.

Herein, the TCU may determine an about-to-occur track of any vehicle within a management range, and about-to-occur tracks of all vehicles may form a network or a graph. An example of the network or the graph is shown in FIG. 3. Solid lines with arrows are about-to-occur tracks that are of vehicles and that are determined by the TCU, and it may be considered that the about-to-occur tracks of the different vehicles form a network. It can be seen from FIG. 3 that there may be an intersection point between line segments of two about-to-occur tracks. The intersection point may be understood as a track intersection or a track crossing. For example, collision may occur when space-time positions of two vehicles herein intersect, and risk assessment may be performed based on this.

For the first vehicle and the second vehicle, the first about-to-occur track is determined based on at least one of the traveling status information of the first vehicle, a traveling direction attribute of a lane in which the first vehicle is currently located, and driving intention information of the first vehicle; and the second about-to-occur track is determined based on at least one of traveling status information of the second vehicle, a traveling direction attribute of a lane in which the second vehicle is currently located, and driving intention information of the second vehicle.

It may also be seen from FIG. 3 that there may be at least one possible about-to-occur track for a target vehicle. For example, a vehicle traveling straight may perform lane change behavior. In this case, an about-to-occur track of the vehicle may be traveling straight, traveling by changing lanes to the left, or traveling by changing lanes to the right.

Figure 4:
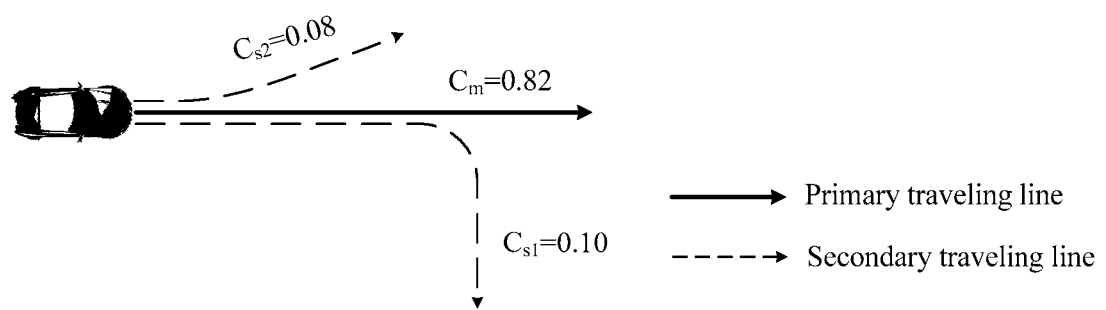
FIG. 4 is a schematic diagram of a primary traveling track and secondary traveling tracks according to an embodiment of the present invention.

In this embodiment, a plurality of about-to-occur tracks of the vehicle are classified into a primary traveling track and a secondary traveling track based on degrees of occurrence probabilities. An occurrence probability of the primary traveling track is higher than an occurrence probability of the secondary traveling track. The TCU may determine the occurrence probability of the primary traveling track and the occurrence probability of the secondary traveling track based on the traveling status information. For example, an occurrence probability of a first primary traveling track and an occurrence probability of a first secondary traveling track are determined based on the traveling status information of the first vehicle, and the second about-to-occur track of the second vehicle is determined based on the traveling status information of the second vehicle. Certainly, one vehicle may have one or more secondary traveling tracks. The TCU may determine the primary traveling track and the secondary traveling track based on at least one of the traveling status information of the vehicle, the traveling direction attribute of the lane in which the vehicle is currently located, and the driving intention information of the vehicle. For example, an attribute of the lane in which the vehicle is currently located is a straight lane, but the vehicle may change lanes to the left or right. If the steering wheel angle of the vehicle is close to zero, it is determined that the vehicle is more likely to travel straight. In this case, an about-to-occur track of traveling straight is a primary traveling track, and an about-to-occur track of traveling by changing lanes to the left or right is a secondary traveling track. For another example, the TCU receives information about turning on a turn light, and may determine, based on the steering wheel angle, that the vehicle is likely to turn right. In this case, an about-to-occur track of turning right is a primary traveling track, and about-to-occur tracks of traveling straight and turning left are secondary traveling tracks. In some embodiments, confidence coefficients are assigned to the primary traveling track and the secondary traveling track. The confidence coefficient is used to represent an occurrence probability of a traveling track. A larger confidence coefficient indicates a higher occurrence probability of a traveling track. It is assumed that the confidence coefficient is indicated by C. In a possible example shown in FIG. 4, a vehicle has three about-to-occur tracks that include one primary traveling track and two secondary traveling tracks. The primary traveling track is indicated by using a solid line with an arrow, and the secondary traveling tracks are indicated by using dashed lines with arrows. A confidence coefficient of the primary traveling track is $C_m=0.82$, a confidence coefficient of a secondary traveling track of turning left is $C_{s2}=0.08$, and a confidence coefficient of a secondary traveling track of turning right is $C_{s1}=0.10$. In actual application, the TCU may further analyze a driver difference by using big data, determine a driving characteristic of a driver, and assist in determining a primary traveling track and a secondary traveling track based on the driving characteristic. For example, for a vehicle driven by a driver who often changes lanes suddenly, a confidence coefficient of a secondary traveling track of changing lanes to the left or right needs to be appropriately increased.

In this embodiment, according to a risk maximization principle, risk estimation is performed on each possible about-to-occur track of the target vehicle, or an about-to-occur track with a relatively large weight is selected for risk estimation. Usually, if the confidence coefficient of the primary traveling track is greater than a specified first threshold, risk assessment is performed only on the primary traveling track. Alternatively, if a difference between the confidence coefficient of the primary traveling track and the confidence coefficient of the secondary traveling track is greater than a specified second threshold, risk assessment is performed only on the primary traveling track. When the difference between the confidence coefficient of the primary traveling track and the confidence coefficient of the secondary traveling track is not greater than the specified second threshold, it indicates that a probability that the secondary traveling track of the vehicle occurs is higher, and it is more valuable to perform risk assessment on the secondary traveling track. In this case, risk assessment is performed on not only the primary traveling track, but also on the secondary traveling track. The first threshold and the second threshold are empirical values. For example, the first threshold is 0.9, and the second threshold is 0.85.

In this way, a case in which the first about-to-occur track intersects the second about-to-occur track of the second vehicle in step 202 may include the following several cases:

The first primary traveling track intersects a second primary traveling track, or the first primary traveling track intersects a second secondary traveling track, or the first secondary traveling track intersects a second primary traveling track, or the first secondary traveling track intersects a second secondary traveling track.

Regardless of which case in which the tracks intersect, the TCU may send a warning. Alternatively, in a scenario in which risk estimation is not performed on the secondary traveling track, the TCU sends a warning when determining that the first primary traveling track intersects the second primary traveling track or that the first primary traveling track intersects the second secondary traveling track.

Figure 5:
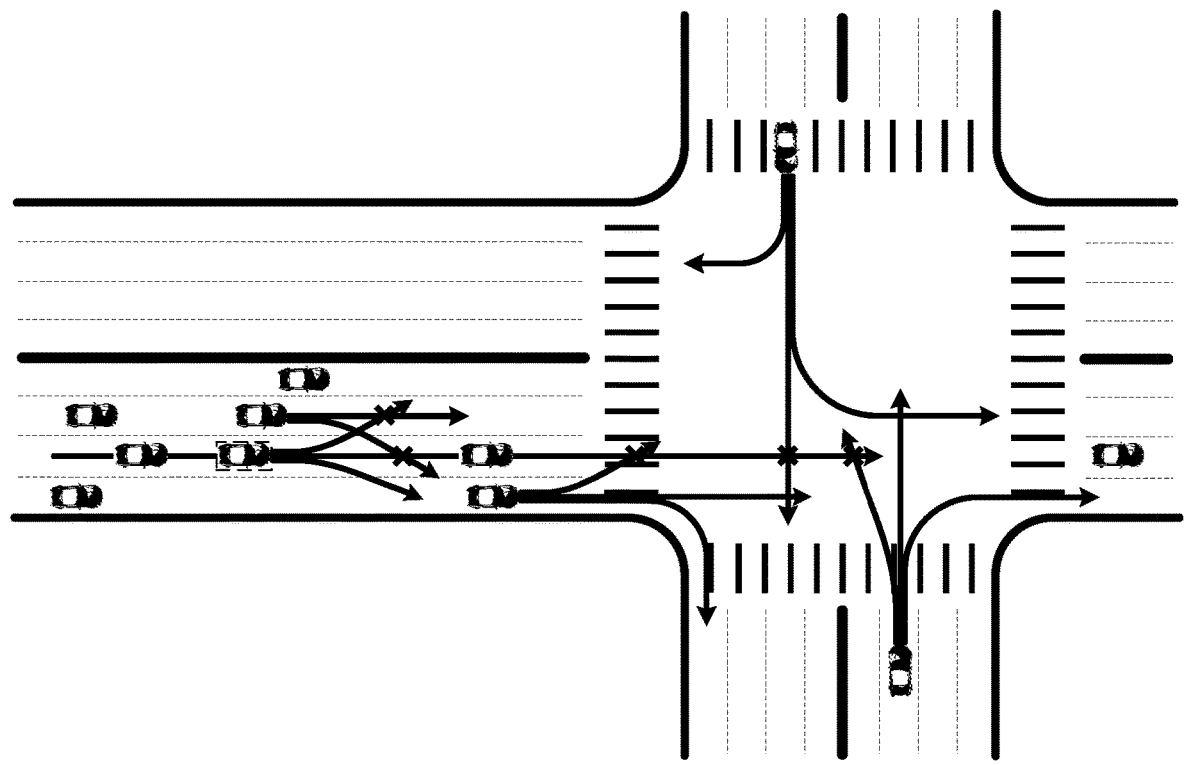
FIG. 5 is a schematic diagram in which about-to-occur tracks intersect according to an embodiment of the present invention.

For example, as shown in FIG. 5, the TCU determines about-to-occur tracks of vehicles, and the about-to-occur tracks of the vehicles form a network. About-to-occur tracks of some vehicles are not shown in FIG. 5. A vehicle framed by using a dashed-line frame is a target vehicle, namely, a first vehicle. The target vehicle has three about-to-occur tracks. A primary traveling track is a traveling track of traveling straight, and secondary traveling tracks are traveling tracks of turning left and turning right. As shown in FIG. 5, a symbol "x" is used to identify an intersection of about-to-occur tracks. FIG. 5 shows a position at which an about-to-occur track of a second vehicle intersects the primary traveling track of the first vehicle, and it can be seen that there are a plurality of second vehicles. FIG. 5 further shows a position at which the about-to-occur track of the second vehicle intersects the traveling track on which the first vehicle turns left.

In FIG. 5, there are a plurality of positions at which the about-to-occur track of the first vehicle intersects the about-to-occur track of the second vehicle, and risk values of different intersection positions are different. For example, the warning information sent by the TCU may include a risk level. A higher risk level indicates a larger risk value, a greater collision occurrence probability, and a more dangerous case.

In this embodiment, the TCU determines the risk level based on at least one of a distance from an intersection position of the traveling tracks to the first vehicle, a distance from the intersection position of the traveling tracks to the second vehicle, and the occurrence probabilities of the intersecting traveling tracks.

For example, the risk level may be determined by using, but not limited to, the following rules:

1. A risk level in a case in which the intersection position is on the first primary traveling track is higher than a risk level in a case in which the intersection position is on the first secondary traveling track.

2. A risk level in a case in which the intersection position is on the second primary traveling track is higher than a risk level in a case in which the intersection position is on the second secondary traveling track.

3. A shorter distance from the intersection position to a current position of the first vehicle indicates a higher risk level.

4. A shorter distance from the intersection position to a current position of the second vehicle indicates a higher risk level.

The rules 3 and 4 may also be considered as follows:

a risk level in a case in which the intersection position is on an anterior segment of the first primary traveling track is higher than a risk level in a case in which the intersection position is on a posterior segment of the first primary traveling track;

a risk level in a case in which the intersection position is on an anterior segment of the first secondary traveling track is higher than a risk level in a case in which the intersection position is on a posterior segment of the first secondary traveling track;

a risk level in a case in which the intersection position is on an anterior segment of the second primary traveling track is higher than a risk level in a case in which the intersection position is on a posterior segment of the second primary traveling track; and a risk level in a case in which the intersection position is on an anterior segment of the second secondary traveling track is higher than a risk level in a case in which the intersection position is on a posterior segment of the second secondary traveling track.

The anterior segment of the first primary traveling track and the anterior segment of the first secondary traveling track are tracks of the first vehicle that are to occur within first sub-duration from the current moment. The posterior segment of the first primary traveling track and the posterior segment of the first secondary traveling track are tracks of the first vehicle that are to occur within second sub-duration after the first sub-duration. The anterior segment of the second primary traveling track and the anterior segment of the second secondary traveling track are tracks of the second vehicle that are to occur within the first sub-duration from the current moment. The posterior segment of the second primary traveling track and the posterior segment of the second secondary traveling track are tracks of the second vehicle that are to occur within the second sub-duration after the first sub-duration. The preset duration is a sum of the first sub-duration and the second sub-duration.

In detail, to help determine the risk level, in an example implementation, the TCU segments the about-to-occur track into an anterior segment close to the current position and a posterior segment away from the current position, or an anterior segment may be referred to as a segment A, and a posterior segment may be referred to as a segment B. The segment A and the segment B may be equal. For example, a midpoint of an entire process of the about-to-occur track is used as a division point between the anterior segment and the posterior segment, and a first half segment close to the current position is denoted as the segment A, and a second half segment away from the current position is denoted as the segment B. Alternatively, the segment A and the segment B may be unequal. For example, it is assumed that the preset duration is t, a traveling track that is to occur within duration $t_1$ from a current moment is denoted as the segment A, a traveling track that is to occur within duration $t_2$ from an end point of the segment A is denoted as the segment B, and $t_1+t_2=t$. In actual application, the TCU may analyze a driver difference by using big data, determine a driving characteristic of a driver, and assist in determining a segmentation point between the segment A and the segment B based on the driving characteristic. For example, for a vehicle driven by a driver who often overtakes or accelerates, a segment A of an about-to-occur traveling track needs to be appropriately lengthened.

Figure 6A:
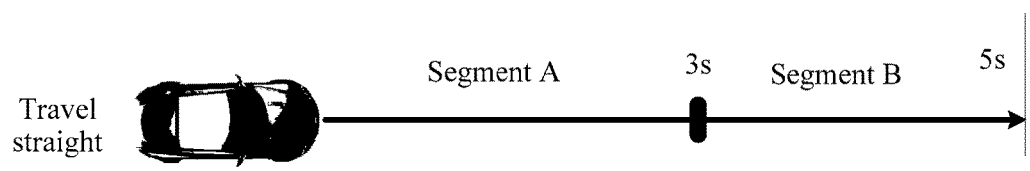
FIG. 6a is a first schematic diagram of segmentation of an about-to-occur track according to an embodiment of the present invention.
Figure 6B:
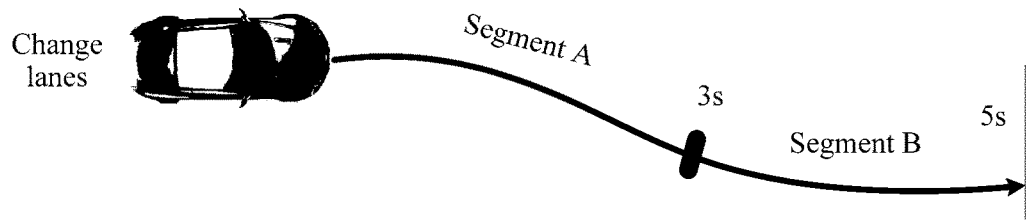
FIG. 6b is a second schematic diagram of segmentation of an about-to-occur track according to an embodiment of the present invention.
Figure 6C:
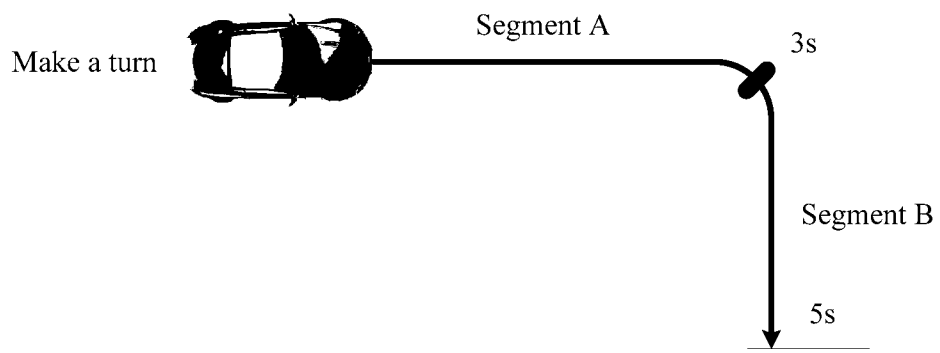
FIG. 6c is a third schematic diagram of segmentation of an about-to-occur track according to an embodiment of the present invention.

It is assumed that the preset duration is 5 seconds, $t_1$ is 3 seconds, and $t_2$ is 2 seconds. As shown in FIG. 6a to FIG. 6c, an about-to-occur track on which a vehicle travels straight, an about-to-occur track on which the vehicle changes lanes, and an about-to-occur track on which the vehicle makes a turn each are segmented based on the duration $t_1$ and the duration $t_2$.

The following describes the risk level determining based on the segmenting the about-to-occur track into the segment A and the segment B. It is assumed that risk levels are classified into three levels, which are sequentially sorted as a first level, a second level, and a third level based on risk urgency and severity degrees.

The first level indicates that an urgent and important risk may occur at an intersection position and that a possibility is very high, and a countermeasure needs to be immediately taken.

The second level indicates that an important risk may occur at an intersection position and that a possibility is relatively high, and attention needs to be paid and a countermeasure needs to be taken depending on a case.

The third level indicates that a mild risk may occur at an intersection position or that a risk is expected to occur at a time relatively far away from a current moment, and appropriate attention needs to be paid but there is no need to take a countermeasure for the moment.

The TCU determines the risk level based on whether the intersection position is on the segment A or the segment B of the about-to-occur track and is on the primary traveling track or the secondary traveling track. A possible determining manner is shown in Table 1. In Table 1, a target vehicle in Table 1 is the first vehicle, and a risky vehicle is the second vehicle. A level 1 is the first level, a level 2 is the second level, and a level 3 is the third level.

TABLE 1

|  | Segment A of a primary traveling track of the risky vehicle | Segment B of the primary traveling track of the risky vehicle | Segment A of a secondary traveling track of the risky vehicle | Segment B of the secondary traveling track of the risky vehicle |
|---|---|---|---|---|
| Segment A of a primary traveling track of the target vehicle | Level 1 | Level 2 | Level 2 | Level 3 |
| Segment B of the primary traveling track of the target vehicle | Level 2 | Level 3 | Level 3 | Level 3 |
| Segment A of a secondary traveling track of the target vehicle | Level 2 | Level 3 | Level 3 | / |
| Segment B of the secondary traveling track of the target vehicle | Level 3 | Level 3 | / | / |

As shown in Table 1, if the intersection position is an intersection of the segment A of the primary traveling track of the target vehicle and the segment A of the primary traveling track of the risky vehicle, the risk level is set to the first level. If the intersection position is an intersection of the segment B of the primary traveling track of the target vehicle and the segment A of the primary traveling track of the risky vehicle, the risk level is set to the second level. If the intersection position is an intersection of the segment A of the primary traveling track of the target vehicle and the segment B of the primary traveling track of the risky vehicle, the risk level is set to the second level. If the intersection position is an intersection of the segment A of the secondary traveling track of the target vehicle and the segment B of the secondary traveling track of the risky vehicle, the risk level is set to the third level. In Table 1, "/" represents that the risk level is very low, and the warning information may not be sent.

Figure 7:
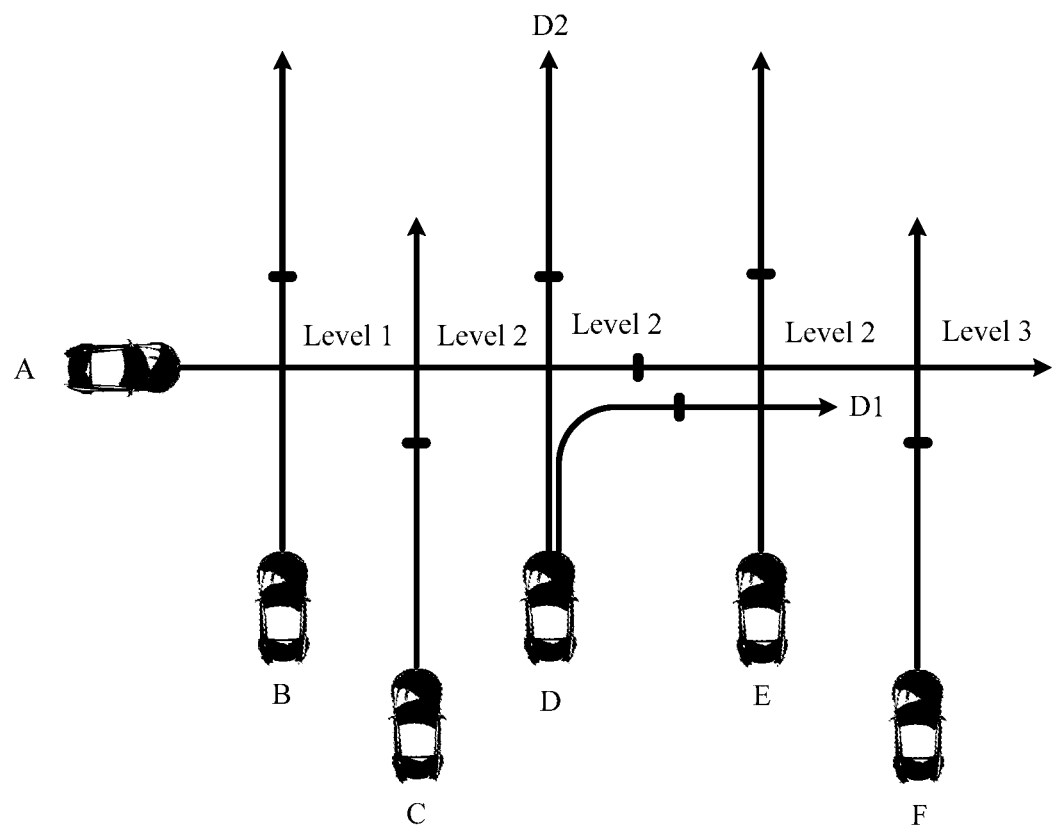
FIG. 7 is a schematic diagram of risk level classification according to an embodiment of the present invention.

The following illustrates the foregoing risk level classification by using FIG. 7. The target vehicle is A, and B, C, D, E, and F are all risky vehicles. Solid lines with arrows represent about-to-occur tracks. D has two about-to-occur tracks, D1 is a secondary traveling track, and D2 is a primary traveling track. Each about-to-occur track is divided into two segments. The risk level is determined based on an intersection position.

It should be understood that the foregoing risk level determining is merely an example. In actual application, the TCU may further optimize the risk level with reference to times such as a braking time, an acceleration time, and a turn time.

The warning information may include, but is not limited to, at least one of the intersection position, the risk level, attribute information of a risky vehicle, and a suggestion of taking a measure. The attribute information of the risky vehicle may include a position, a vehicle head direction, a speed, a vehicle model, a color, whether the vehicle is a vehicle with a special task, and the like. The suggestion of taking a measure may include suggestions of acceleration, deceleration, a lane change and the like that are given to the target vehicle. In addition, at a junction, the TCU may further send a warning based on traffic light information and information about whether the vehicle travels in a correct lane, to give a corresponding prompt or suggestion.

Moreover, in addition to the foregoing case, there may be a vehicle in a same lane as the target vehicle. For the vehicle, whether the vehicle is a risky vehicle may be determined by using the following method.

Figure 8:
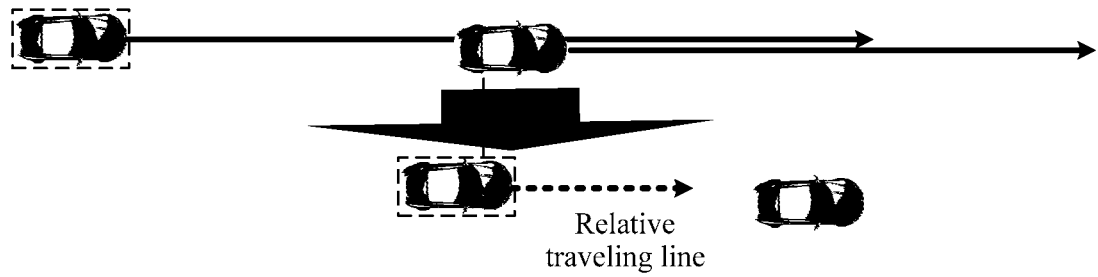
FIG. 8 is a first schematic diagram of determining a risky vehicle in a vehicle-following scenario according to an embodiment of the present invention.

The to-be-determined vehicle may be located in front of or behind the target vehicle in the same lane. If a distance is relatively short, there may be a partial overlap between the about-to-occur track of the target vehicle and an about-to-occur track of the to-be-determined vehicle. The partial overlap means that there are at least two intersection points. In this embodiment of the present invention, the intersection case means that there is one intersection point on the two about-to-occur tracks, and does not include the partial overlap case. It is assumed that the target vehicle is still the first vehicle, and the to-be-determined vehicle is still the second vehicle. In this scenario, to be specific, when it is determined that there is a partial overlap between the first about-to-occur track of the first vehicle and the second about-to-occur track of the second vehicle, it is determined whether the second vehicle is located on a relative traveling track between the first vehicle and the second vehicle within the preset duration from the current moment; and if yes, it is determined that the second vehicle is a risky vehicle, and the warning information is sent; or otherwise, it is determined that the second vehicle is not a risky vehicle. The relative traveling track is changes in relative positions of the first vehicle and the second vehicle within the preset duration from the current moment, namely, a change in a relative distance between the first vehicle and the second vehicle within the preset duration. The relative distance may be lengthened or may be shortened. If the second vehicle falls on the relative traveling track, a fall point may be considered as the foregoing intersection position. In this scenario, a method for determining the risk level and sending a warning is the same as that in the foregoing scenario in which the tracks intersect. Repetition is not described herein again. As shown in FIG. 8, a vehicle framed by a dashed-line frame is the first vehicle, and a vehicle in front of the vehicle framed by the dashed-line frame is the second vehicle. Solid lines with arrows respectively indicate the about-to-occur track of the first vehicle and the about-to-occur track of the second vehicle, and a dashed line with an arrow indicates the relative traveling track between the two vehicles within the preset duration. To be specific, a distance between the two vehicles within the preset duration is shortened by a distance indicated by the relative traveling track. It can be seen from FIG. 8 that the second vehicle does not fall on the relative traveling track, and it indicates that the second vehicle is not a risky vehicle and a warning does not need to be sent. In this way, this can help avoid an invalid or incorrect warning sent in a normal vehicle-following scenario.

Figure 9:
FIG. 9 is a second schematic diagram of determining a risky vehicle in a vehicle-following scenario according to an embodiment of the present invention.

In some embodiments, in an application scenario in which the vehicles travel in a same lane, although there is a partial overlap between the about-to-occur track of the first vehicle and the about-to-occur track of the second vehicle, this case may be considered as a special intersection scenario, and an intersection position may be set to a start point or a midpoint of a line segment of an overlapped part. As shown in FIG. 9, a vehicle framed by a dashed-line frame is the first vehicle, and a vehicle in front of the vehicle framed by the dashed-line frame is the second vehicle. Solid lines with arrows respectively indicate the about-to-occur track of the first vehicle and the about-to-occur track of the second vehicle, and a symbol "x" identifies an intersection position. In this scenario, a method for determining the risk level and sending a warning may be the same as that in the foregoing scenario in which the tracks intersect, or the risk level may be determined based on a relative speed between the first vehicle and the second vehicle with reference to events such as a braking event, an acceleration event, and a turn event. Repetition is not described herein again.

For example, if the first vehicle and the second vehicle travel in the same lane, the relative speed exists between the first vehicle and the second vehicle. Within the preset duration, a relative displacement occurs between the first vehicle and the second vehicle. If the two vehicles have lane-change or turn times, the relative displacement may also be replaced with a relative distance or a relative track difference. It is determined whether the second vehicle falls within a track line corresponding to the relative displacement within the preset duration. If the second vehicle falls within the track line corresponding to the relative displacement within the preset duration, it is determined that the second vehicle is a risky vehicle, and the warning information is sent. If the second vehicle does not fall within the track line corresponding to the relative displacement within the preset duration, it is determined that the second vehicle is not a risky vehicle.

Further, when risk analysis is performed, the TCU may further determine the risk level with reference to reported information such as the relative speed between the second vehicle and the first vehicle, braking, acceleration, and turning.

In this way, this helps avoid sending invalid warning information in the normal vehicle-following scenario.

In addition, in this embodiment, alternatively, the target vehicle may perform a traffic warning. The TCU sends determined risky-vehicle information and a determined risk estimation result to the target vehicle, and the target vehicle generates warning information based on the received information.

In conclusion, in this embodiment, the about-to-occur track of the target vehicle and an about-to-occur track of an adjacent vehicle are obtained to determine whether the about-to-occur track of the target vehicle intersects the about-to-occur track of the adjacent vehicle. If the about-to-occur track of the target vehicle intersects the about-to-occur track of the adjacent vehicle, the adjacent vehicle is a risky vehicle, and a warning is sent to the target vehicle. In this way, this can help implement more accurate and effective risk estimation to provide a more valuable safety warning for the target vehicle. An implementation process of the method is simple and effective, the warning information provided for the target vehicle is more targeted and accurate, and information processing of a vehicle-mounted terminal can be simplified, to reduce a terminal requirement.

Figure 10:
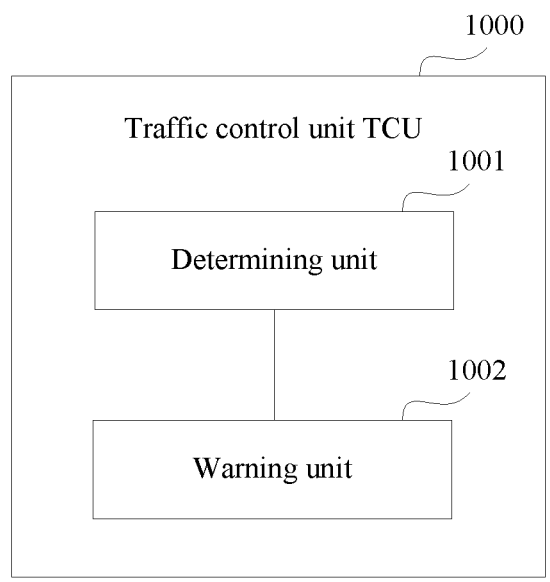
FIG. 10 is a first schematic structural diagram of a traffic control unit TCU according to an embodiment of the present invention.

Based on a same inventive concept as the cellular network-based assisted driving method shown in FIG. 2, as shown in FIG. 10, an embodiment of the present invention further provides a traffic control unit TCU 1000. The traffic control unit TCU 1000 is configured to perform the cellular network-based assisted driving method shown in FIG. 2, and the traffic control unit TCU 1000 includes a determining unit 1001 and a warning unit 1002.

The determining unit 1001 is configured to determine a first about-to-occur track of a first vehicle based on traveling status information of the first vehicle, where the first about-to-occur track is a traveling track of the first vehicle that is to occur within preset duration from a current moment, the first about-to-occur track includes a first primary traveling track and at least one first secondary traveling track, an occurrence probability of the first primary traveling track is greater than an occurrence probability of the first secondary traveling track, and the occurrence probability of the first primary traveling track and the occurrence probability of the first secondary traveling track are determined by using the traveling status information of the first vehicle.

The warning unit 1002 is configured to send warning information to the first vehicle if the warning unit 1002 determines that a second about-to-occur track of a second vehicle intersects the first about-to-occur track within a management range, where the second about-to-occur track is a traveling track of the second vehicle that is to occur within the preset duration from the current moment, and the second about-to-occur track of the second vehicle is determined by using traveling status information of the second vehicle.

Details of the method performed by the traffic control unit TCU 1000 are the same as those in the foregoing method embodiments, and are not described herein again.

Figure 11:
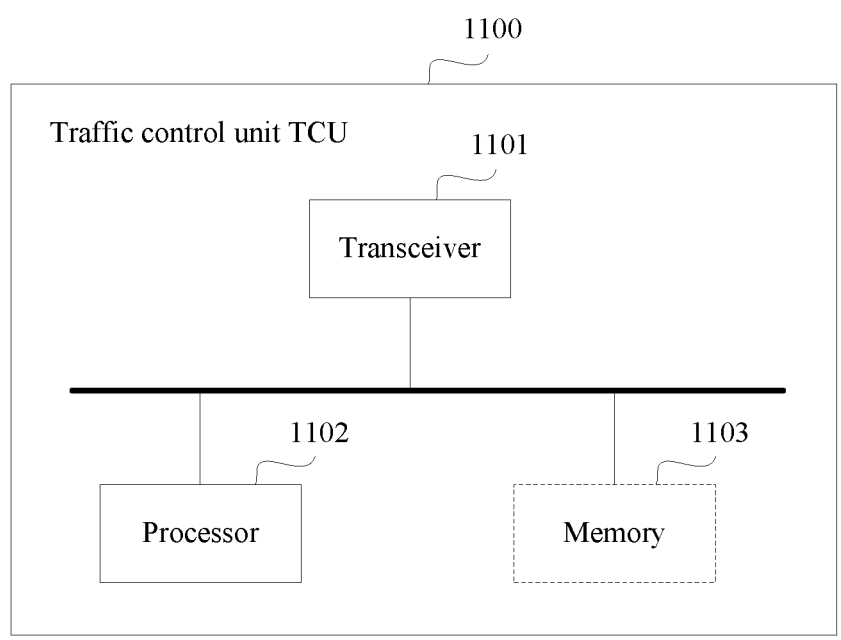
FIG. 11 is a second schematic structural diagram of a traffic control unit TCU according to an embodiment of the present invention.

Based on a same inventive concept as the cellular network-based assisted driving method shown in FIG. 2, as shown in FIG. 11, an embodiment of the present invention further provides a traffic control unit TCU 1100. The traffic control unit TCU 1100 may be configured to perform the cellular network-based assisted driving method shown in FIG. 2. The traffic control unit TCU 1100 includes a transceiver 1101 and a processor 1102, and In some embodiments, may further include a memory 1103. The processor 1102 is configured to execute code in the memory 1103. When the code is executed, the execution enables the processor 1102 to perform the cellular network-based assisted driving method shown in FIG. 2.

The processor 1102 may be a central processing unit (CPU), a network processor (NP), or a combination of a CPU and an NP.

The processor 1102 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1103 may include a volatile memory (volatile memory), such as a random access memory (RAM); the memory 1103 may include a nonvolatile memory, such as a flash memory (flash memory), a hard disk drive (HDD), or a solid state drive (SSD); or the memory 1103 may include a combination of the foregoing types of memories.

In some embodiments, the traffic control unit TCU 1100 may be a chip or an integrated circuit during specific implementation.

An embodiment of the present invention provides a computer storage medium storing a computer program, and the computer program includes an instruction used to perform the cellular network-based assisted driving method shown in FIG. 2.

An embodiment provides a computer program product that includes an instruction. When the computer program product is run on a computer, the computer is enabled to perform the cellular network-based assisted driving method shown in FIG. 2.

Persons skilled in the art should understand that various embodiments may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Although some embodiments have been described, persons skilled in the art can make changes and modifications to these embodiments once they learn the basic inventive concept. Therefore, the following claims are intended to be construed as to cover the preferred embodiments and all changes and modifications falling within the scope of the present invention.

Apparently, persons skilled in the art can make various modifications and variations to the embodiments of the present invention without departing from the spirit and scope of the embodiments of the present invention. In this way, the present invention is intended to cover these modifications and variations provided that they fall within the scope of protection defined by the following claims and their equivalent technologies.

What is claimed is:

1. A cellular network-based assisted driving method, comprising:
    determining, by a traffic control unit (TCU), a first about-to-occur track of a first vehicle based on traveling status information of the first vehicle within a management range of the TCU, wherein the first about-to-occur track is a traveling track of the first vehicle that is to occur within a preset duration from a current moment, the first about-to-occur track comprising a first primary traveling track and at least one first secondary traveling track,
    assigning an occurrence probability to the first primary traveling track and an occurrence probability to the first secondary traveling track, wherein the occurrence probability of the first primary traveling track is greater than the occurrence probability of the first secondary traveling track; and
    sending, by the TCU, warning information to the first vehicle if the TCU determines that a second about-to-occur track of a second vehicle intersects the first about-to-occur track within the management range of the TCU, wherein the second about-to-occur track is a traveling track of the second vehicle that is to occur within the preset duration from the current moment, and the second about-to-occur track of the second vehicle is determined by using traveling status information of the second vehicle.

2. The method according to claim 1, wherein the traveling status information comprises at least one of a position, a vehicle head direction, a steering wheel angle, a vehicle speed, acceleration, an angular speed, or angular acceleration.

3. The method according to claim 1, wherein the second about-to-occur track comprises a second primary traveling track and at least one second secondary traveling track, and an occurrence probability of the second primary traveling track is greater than an occurrence probability of the second secondary traveling track, wherein the occurrence probability of the second primary traveling track and the occurrence probability of the second secondary traveling track are determined by using the traveling status information of the second vehicle; and
    determining that the second about-to-occur track intersects the first about-to-occur track comprises at least one of the following:
    determining that the second primary traveling track intersects the first primary traveling track, or determining that the second secondary traveling track intersects the first primary traveling track; and
    determining that the second primary traveling track intersects the first secondary traveling track, or determining that the second secondary traveling track intersects the first secondary traveling track.

4. The method according to claim 1, wherein the warning information comprises a risk level; and
the method further comprises:
determining, by the TCU, the risk level based on at least one of a distance from an intersection position to the first vehicle, a distance from the intersection position to the second vehicle, and the occurrence probabilities of the intersecting traveling tracks.

5. The method according to claim 4, wherein
a risk level in a case in which the intersection position is on the first primary traveling track is higher than a risk level in a case in which the intersection position is on the first secondary traveling track;
a risk level in a case in which the intersection position is on the second primary traveling track is higher than a risk level in a case in which the intersection position is on the second secondary traveling track;
a risk level in a case in which the intersection position is on an anterior segment of the first primary traveling track is higher than a risk level in a case in which the intersection position is on a posterior segment of the first primary traveling track;
a risk level in a case in which the intersection position is on an anterior segment of the first secondary traveling track is higher than a risk level in a case in which the intersection position is on a posterior segment of the first secondary traveling track;
a risk level in a case in which the intersection position is on an anterior segment of the second primary traveling track is higher than a risk level in a case in which the intersection position is on a posterior segment of the second primary traveling track; and
a risk level in a case in which the intersection position is on an anterior segment of the second secondary traveling track is higher than a risk level in a case in which the intersection position is on a posterior segment of the second secondary traveling track, wherein
the anterior segment of the first primary traveling track and the anterior segment of the first secondary traveling track are tracks of the first vehicle that are to occur within first sub-duration from the current moment;
the posterior segment of the first primary traveling track and the posterior segment of the first secondary traveling track are tracks of the first vehicle that are to occur within second sub-duration after the first sub-duration;
the anterior segment of the second primary traveling track and the anterior segment of the second secondary traveling track are tracks of the second vehicle that are to occur within the first sub-duration from the current moment;
the posterior segment of the second primary traveling track and the posterior segment of the second secondary traveling track are tracks of the second vehicle that are to occur within the second sub-duration after the first sub-duration; and
the preset duration is a sum of the first sub-duration and the second sub-duration.

6. The method according to claim 1, wherein the intersection comprises that there is one intersection point; and
the method further comprises:
when it is determined that there is a partial overlap between the first about-to-occur track and the second about-to-occur track, determining whether the second vehicle is located on a relative traveling track between the first vehicle and the second vehicle within the preset duration from the current moment; and
if the second vehicle is located in the relative traveling track, sending the warning information, wherein
the partial overlap indicates that there are at least two intersection points, and the relative traveling track is a track formed by changes in relative positions of the first vehicle and the second vehicle within the preset duration from the current moment.

7. The method according to claim 1, wherein the method further comprises:
obtaining, by the TCU, the traveling status information of the first vehicle in at least one of the following manners: a manner of performing reporting by the first vehicle, a manner of performing reporting through sensing by using another vehicle sensor, a manner of performing reporting through collection by a roadside sensor, a manner of performing reporting by a roadside signal device, and a manner of performing notification by a central service unit or an adjacent TCU.

8. A traffic control unit TCU, wherein the TCU comprises:
a determining unit, configured to:
determine a first about-to-occur track of a first vehicle based on traveling status information of the first vehicle within a management range, wherein the first about-to-occur track is a traveling track of the first vehicle that is to occur within a preset duration from a current moment, the first about-to-occur track comprising a first primary traveling track and at least one first secondary traveling track, and
assign an occurrence probability to the first primary traveling track and an occurrence probability to the first secondary traveling track, wherein the occurrence probability of the first primary traveling track is greater than the occurrence probability of the first secondary traveling track; and
a warning unit, configured to send warning information to the first vehicle if the warning unit determines that a second about-to-occur track of a second vehicle intersects the first about-to-occur track within the management range, wherein the second about-to-occur track is a traveling track of the second vehicle that is to occur within the preset duration from the current moment, and the second about-to-occur track of the second vehicle is determined by using traveling status information of the second vehicle.

9. The TCU according to claim 8, wherein the traveling status information comprises at least one of a position, a vehicle head direction, a steering wheel angle, a vehicle speed, acceleration, an angular speed, and angular acceleration.

10. The TCU according to claim 8, wherein the second about-to-occur track comprises a second primary traveling track and at least one second secondary traveling track, an occurrence probability of the second primary traveling track is greater than an occurrence probability of the second secondary traveling track, and the occurrence probability of the second primary traveling track and the occurrence probability of the second secondary traveling track are determined by using the traveling status information of the second vehicle; and
when the warning unit determines that the second about-to-occur track intersects the first about-to-occur track, this determination comprises at least one of the following:
determining that the second primary traveling track intersects the first primary traveling track, or determining that the second secondary traveling track intersects the first primary traveling track; and determining that the second primary traveling track intersects the first secondary traveling track, or determining that the second secondary traveling track intersects the second primary traveling track.

11. The TCU according to claim 8, wherein the warning information comprises a risk level; and
the warning unit is further configured to determine the risk level based on at least one of a distance from the intersection position to the first vehicle, a distance from the intersection position to the second vehicle, and the occurrence probabilities of the intersecting traveling tracks.

12. The TCU according to claim 11, wherein
a risk level in a case in which the intersection position is on the first primary traveling track is higher than a risk level in a case in which the intersection position is on the first secondary traveling track;
a risk level in a case in which the intersection position is on the second primary traveling track is higher than a risk level in a case in which the intersection position is on the second secondary traveling track;
a risk level in a case in which the intersection position is on an anterior segment of the first primary traveling track is higher than a risk level in a case in which the intersection position is on a posterior segment of the first primary traveling track;
a risk level in a case in which the intersection position is on an anterior segment of the first secondary traveling track is higher than a risk level in a case in which the intersection position is on a posterior segment of the first secondary traveling track;
a risk level in a case in which the intersection position is on an anterior segment of the second primary traveling track is higher than a risk level in a case in which the intersection position is on a posterior segment of the second primary traveling track; and
a risk level in a case in which the intersection position is on an anterior segment of the second secondary traveling track is higher than a risk level in a case in which the intersection position is on a posterior segment of the second secondary traveling track, wherein
the anterior segment of the first primary traveling track and the anterior segment of the first secondary traveling track are tracks of the first vehicle that are to occur within first sub-duration from the current moment;
the posterior segment of the first primary traveling track and the posterior segment of the first secondary traveling track are tracks of the first vehicle that are to occur within second sub-duration after the first sub-duration;
the anterior segment of the second primary traveling track and the anterior segment of the second secondary traveling track are tracks of the second vehicle that are to occur within the first sub-duration from the current moment;
the posterior segment of the second primary traveling track and the posterior segment of the second secondary traveling track are tracks of the second vehicle that are to occur within the second sub-duration after the first sub-duration; and
the preset duration is a sum of the first sub-duration and the second sub-duration.

13. The TCU according to claim 8, wherein the intersection comprises that there is one intersection point; and
the warning unit is further configured to:
when determining that there is a partial overlap between the first about-to-occur track and the second about-to-occur track, determine whether the second vehicle is located on a relative traveling track between the first vehicle and the second vehicle within the preset duration from the current moment; and if yes, send the warning information, wherein
the partial overlap indicates that there are at least two intersection points, and the relative traveling track is a track formed by changes in relative positions of the first vehicle and the second vehicle within the preset duration from the current moment.

14. The TCU according to claim 8, wherein the determining unit is further configured to:
obtain the traveling status information of the first vehicle in at least one of the following manners: a manner of performing reporting by the first vehicle, a manner of performing reporting through sensing by using another vehicle sensor, a manner of performing reporting through collection by a roadside sensor, a manner of performing reporting by a roadside signal device, and a manner of performing notification by a central service unit or an adjacent TCU.

15. A non-transitory computer storage medium, wherein the computer storage medium stores a computer program, and the computer program comprises an instruction used to perform the method according to claim 1.

* * * * *